Patented Dec. 26, 1939

2,184,274

UNITED STATES PATENT OFFICE 2,184,274

FLUORESCENT MATERIALS

Gorton R. Fonda, Schenectady, N. Y., assignor to General Electric Company, a corporation of New York No Drawing. Application June 17, 1938, Serial No. 214,384

3 Claims. (Cl. 250—81)

The present invention relates to fluorescent lamps, and comprises in particular new fluorescent materials (phosphors), which are capable of emitting substantially white light, and which exhibit a substantial amount of phosphorescence.

In accordance with my present invention, I have provided fluorescent materials comprising a compound of calcium, tungsten, or molybdenum, and oxygen (which will be termed, respectively, calcium tungstate or molybdate), and containing also constituents of samarium and lead which function as activators.

In the preparation of such new fluorescent materials about 20 parts of calcium oxide, CaO, and about 79 parts of tungstic oxide, $WO_3$, (all parts being by weight) are thoroughly mixed in a finely-divided state after adding about 0.5 per cent of samarium as the oxide, $Sm_2O_3$, and about 1.0 per cent of lead, as a suitable compound, such for example, as the acetate of lead. This mixture is fired in air for about four hours at 1000° C. These proportions are illustrative, considerable variation being permissible. Ordinarily, 1.0 per cent of lead, calculated as an elementary constituent gives best results. The samarium content may be as low as 0.1 per cent. For some purposes it may be advantageous to employ samarium contents somewhat above 0.5 per cent because this will increase the fluorescence in the red spectral range. One per cent of samarium oxide causes the emitted fluorescent light to be somewhat pinkish, the red tinge deepening with the samarium content up to about 3 per cent. The lead content enhances the fluorescent light emission in the blue spectral range.

In the absence of both samarium and lead, calcium tungstate will fluoresce with a pale bluish light, and will exhibit substantially no phosphorescene. The addition of samarium alone to calcium tungstate will cause the superposition of enough red bands on the normal spectrum of calcium tungstate to cause the fluorescent light to be light pink, the intensity of the pink hue varying from a light pink with a content of about 0.5 per cent of samarium to a stronger pink with a content of 1.5 per cent of samarium. In other words, an increase in samarium content leads to an increase in intensity of red bands in the emitted spectrum. As a consequence of this, the general color of the fluorescence emitted by the phosphor becomes more and more pink as the samarium content is increased. The addition of a suitable amount of lead not only results in substantially white fluorescence, but also increases the brightness or intensity of light emission.

This combination of samarium and lead produces similar advantages when added to calcium molybdate, although the normal fluorescence brightness of calcium molybdate alone is not enhanced as much by this addition as occurs in the case of calcium tungstate.

When the color of the fluorescent light emitted by calcium tungstate, or molybdate, is not of main consideration, but it is desired mainly to induce an appreciable degree of phosphorescence in these substances, then samarium may be replaced wholly or partly by lanthanum or erbium.

The described fluorescent materials may be applied to the interior wall of the envelope of electric discharge devices in which ultra-violet radiations adapted to excite fluorescence in such coated materials are generated. Suitable binders may be used, such for example as potassium silicate or cellulose acetate. Examples of lamps in which the described fluorescent materials may be applied upon the inside of the envelope are described in Foulke U. S. Patent No. 2,020,723 of November 12, 1935, McKeag and Randall U. S. Patent No. 2,103,085 of December 21, 1937, and an application for U. S. Letters Patent Serial No. 79,868, filed May 15, 1936 (corresponding to Jenkins British Patent No. 457,486).

What I claim as new and desire to secure by Letters Patent of the United States is:

1. A fluorescent material consisting essentially of a calcium compound of the group consisting of the tungstate and the molybdate, said composition containing also about .5 to 3 per cent of samarium and about 1 per cent of lead calculated as elementary constituents and present in the composition as activators of fluorescence.

2. A fluorescent material comprising essentially calcium tungstate which has associated therewith as activators of fluorescence a minor proportion of samarium and lead.

3. A fluorescent material comprising essentially calcium tungstate which has associated therewith as activators of fluorescence about .5 to 3 per cent of samarium and about 1 per cent of lead.

GORTON R. FONDA.